United States Patent
Nose et al.

(10) Patent No.: US 12,491,864 B2
(45) Date of Patent: Dec. 9, 2025

(54) SADDLE RIDE TYPE VEHICLE

(71) Applicant: HONDA MOTOR CO., LTD., Tokyo (JP)

(72) Inventors: Tsubasa Nose, Tokyo (JP); Kiyotaka Sakai, Tokyo (JP); Atsushi Ogahara, Tokyo (JP); Chikashi Iizuka, Tokyo (JP); Masaki Nakagawara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/712,033

(22) PCT Filed: Sep. 5, 2022

(86) PCT No.: PCT/JP2022/033310
§ 371 (c)(1),
(2) Date: May 21, 2024

(87) PCT Pub. No.: WO2023/095412
PCT Pub. Date: Jun. 1, 2023

(65) Prior Publication Data
US 2025/0018929 A1   Jan. 16, 2025

(30) Foreign Application Priority Data
Nov. 26, 2021   (JP) ................. 2021-192347

(51) Int. Cl.
*B60W 30/045* (2012.01)
*B60W 10/20* (2006.01)
(Continued)

(52) U.S. Cl.
CPC .......... *B60W 30/045* (2013.01); *B60W 10/20* (2013.01); *B60W 10/22* (2013.01);
(Continued)

(58) Field of Classification Search
CPC .... B60W 30/045; B60W 10/20; B60W 10/22; B60W 2300/36; B60W 2520/10;
(Continued)

(56) References Cited

U.S. PATENT DOCUMENTS

| | | |
|---|---|---|
| 2018/0265117 A1 | 9/2018 | Hara et al. |
| 2019/0210644 A1 | 7/2019 | Uchiyama et al. |

(Continued)

FOREIGN PATENT DOCUMENTS

| | | | | |
|---|---|---|---|---|
| JP | 2011073624 A | * | 4/2011 | ............ B62K 21/00 |
| JP | 2019-119446 A | | 7/2019 | |

(Continued)

OTHER PUBLICATIONS

English translation of the International Preliminary Report on Patentability dated May 30, 2024 issued in corresponding International application No. PCT/JP2022/033310 (4 pages).

(Continued)

*Primary Examiner* — Tisha D Lewis
(74) *Attorney, Agent, or Firm* — Rankin, Hill & Clark LLP

(57) ABSTRACT

A saddle-ride vehicle with improved operability when an attitude of the vehicle changes in the opposite direction in a vehicle width direction in a short period of time. The saddle-ride vehicle includes: a steering actuator that applies torque in a steering direction to a suspension supporting a steering wheel; first detector that detects a roll angular velocity of a vehicle; and a controller that controls the steering actuator, based on the roll angular velocity detected by the first detector, to apply the torque to the suspension, in which the controller: includes modes of the control, the modes including a first control mode that performs control to apply a predetermined first steering torque, and a second control mode that performs control to apply a second (Continued)

steering torque smaller than first steering torque; and switches between the first control mode and the second control mode if a predetermined condition is satisfied.

9 Claims, 9 Drawing Sheets

(51) Int. Cl.
  *B60W 10/22* (2006.01)
  *B62J 45/412* (2020.01)
  *B62J 45/415* (2020.01)

(52) U.S. Cl.
  CPC ......... *B62J 45/412* (2020.02); *B62J 45/4151* (2020.02); *B60W 2300/36* (2013.01); *B60W 2520/10* (2013.01); *B60W 2520/18* (2013.01); *B60W 2540/20* (2013.01)

(58) Field of Classification Search
  CPC .......... B60W 2520/18; B60W 2540/20; B62K 21/00; B62J 45/412; B62J 45/4151
  See application file for complete search history.

(56) References Cited

U.S. PATENT DOCUMENTS

| 2020/0277018 | A1* | 9/2020 | Harazono | ............ B62J 45/4151 |
| 2022/0340203 | A1 | 10/2022 | Iizuka et al. | |

FOREIGN PATENT DOCUMENTS

| JP | 6646682 B2 | 2/2020 |
| JP | 2020-158067 A | 10/2020 |
| JP | 2021-054328 A | 4/2021 |
| WO | 2021/065780 A1 | 4/2021 |

OTHER PUBLICATIONS

International Search Report Corresponding to International Application No. PCT/JP2022/033310, dated Nov. 15, 2022, 4 pages.
Written Opinion of the International Preliminary Examining Authority Corresponding to International Application No. PCT/JP2022/033310, dated Jun. 20, 2023, 5 pages.
International Preliminary Report on Patentability Corresponding to International Application No. PCT/JP2022/033310, dated Oct. 10, 2023, 11 pages.
Murakami, et al., "Front-Steering Assist Control for a Motorcycle Considering Nonlinearity of Its Tire Cornering Force", No. 2010-JCR-0334, 2011, The Japan Society of Mechanical Engineers, 14 pages.

* cited by examiner

SADDLE RIDE TYPE VEHICLE

TECHNICAL FIELD

The present invention relates to a saddle-ride vehicle.

BACKGROUND ART

Conventionally, steering assist apparatuses that control the attitude of vehicles are known. For example, Patent Literature 1 (see Japanese Patent Laid-Open No. 2021-54328) describes a steering assist apparatus for a saddle-ride vehicle that can enhance the effect of stabilizing the vehicle body even in a situation in which the tires are likely to slip.

CITATION LIST

Patent Literature

Patent Literature 1

Japanese Patent Laid-Open No. 2021-54328

SUMMARY OF INVENTION

Technical Problem

When a saddle-ride vehicle is running, turning operations are often performed successively in mutually different directions, such as a left turn immediately followed by a right turn. When the rider steers the handle to successively perform such turning operations, there has been a problem that the rider may be caused to feel discomfort if attitude stabilization control, specifically a steering assist to maintain the attitude upright, is performed.

The present invention has been made in view of the above-mentioned circumstances, and it is an object of the present invention to provide a saddle-ride vehicle that can prevent discomfort when turning operations in mutually different directions are performed successively.

Solution to Problem

An aspect of the present invention is a saddle-ride vehicle including: a steering actuator that applies torque in a steering direction to a suspension apparatus supporting a steering wheel; first detection means that detects a roll angular velocity of a vehicle; and a control apparatus that controls the steering actuator, based on the roll angular velocity detected by the first detection means, to apply the torque to the suspension apparatus, in which the control apparatus: includes modes of the control, the modes including a first control mode that performs control to apply a predetermined first steering torque, and a second control mode that performs control to apply a second steering torque smaller than the first steering torque; and switches between the first control mode and the second control mode if a predetermined condition is satisfied.

Note that this description includes all the contents of Japanese Patent Application No. 2021-192347 filed on Nov. 26, 2021.

Advantageous Effect of Invention

According to an aspect of the present invention, in a saddle-ride vehicle, it is possible to prevent discomfort when turning operations in mutually different directions are performed successively.

DESCRIPTION OF EMBODIMENTS

Figure 1:
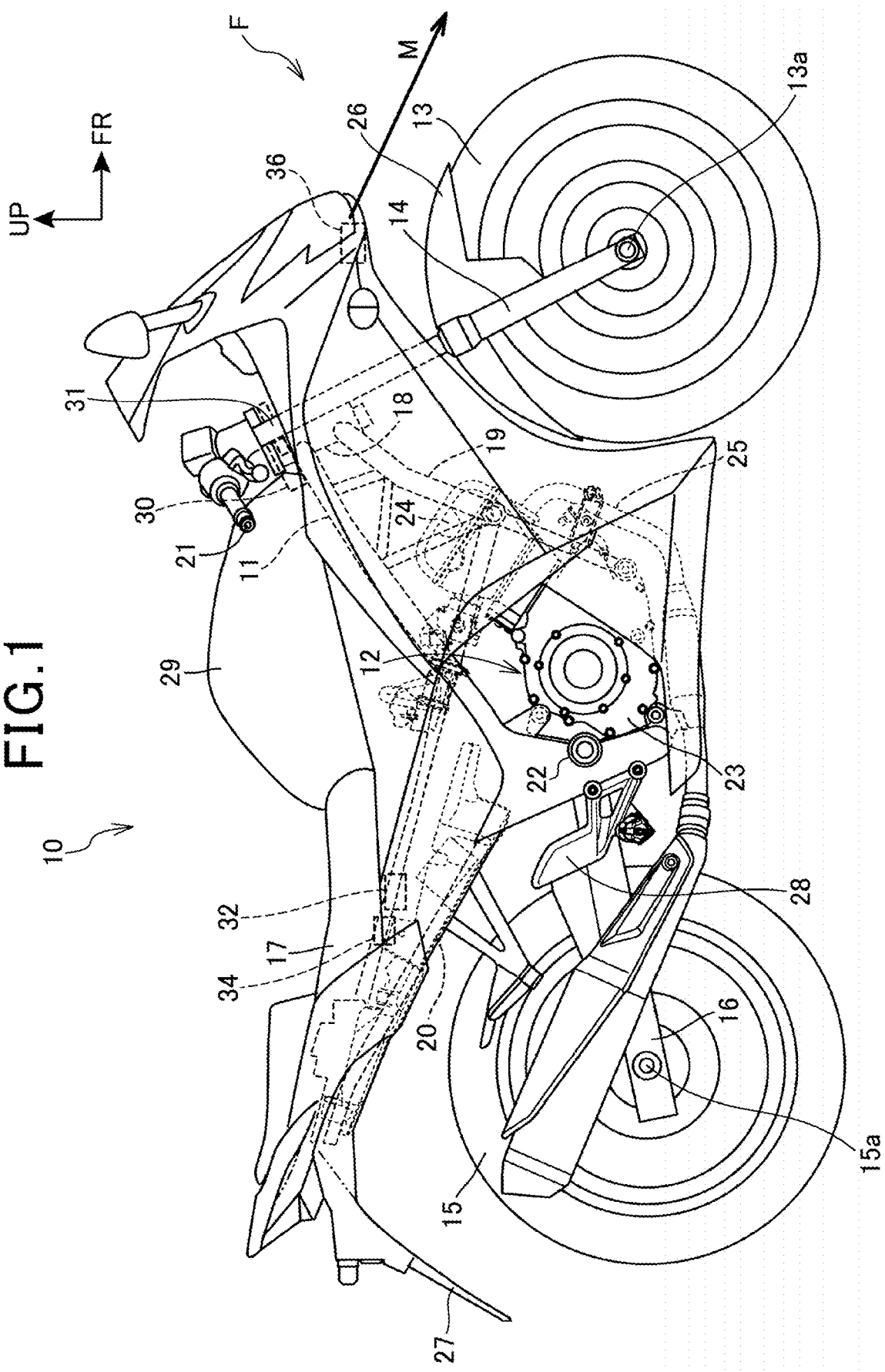
FIG. 1 is a side view of a saddle-ride vehicle.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

A vehicle speed sensor 36 is provided on the front face F of the saddle-ride vehicle 10 as vehicle speed detection means. As the vehicle speed sensor 36, a millimeter wave radar may be used. The vehicle speed sensor 36 is provided near the headlight on the front side of the vehicle 10, and emits millimeter wave radio waves diagonally in front of the vehicle 10 and receives reflected waves thereby detecting the vehicle speed of the vehicle 10.

The method of detecting the vehicle speed may be, for example, a method of detecting with microwaves or laser light. Alternatively, the vehicle speed may be calculated by detecting the wheel speed.

The vehicle 10 includes vehicle behavior detection means 32 that detects behavior information of the vehicle 10. The behavior information of the vehicle 10 includes a roll angle, a roll angular velocity (roll rate), a yaw angle, a yaw angular velocity (yaw rate), a pitch angle and a pitch angular velocity (pitch rate), and acceleration and angular acceleration, of the vehicle 10. The vehicle behavior detection means 32 is, for example, an inertial measurement unit (IMU) that detects translational motion and rotational motion in a plurality of directions perpendicular to each other. The vehicle behavior detection means 32 includes first detection means 56 that detects roll angular velocity and second detection means 57 that detects roll angle.

A control apparatus (ECU: electronic control unit) 34 is provided below the seat 17 to perform processing including measurement of ground speed. The control apparatus 34 includes a CPU (central processing unit), a RAM (random access memory) and a ROM (read only memory), and executes various controls. The CPU is a central processing unit, and executes various programs to realize various functions. The RAM is used as a work area and storage area for the CPU, and the ROM stores an operating system and programs executed by the CPU.

Figure 2:
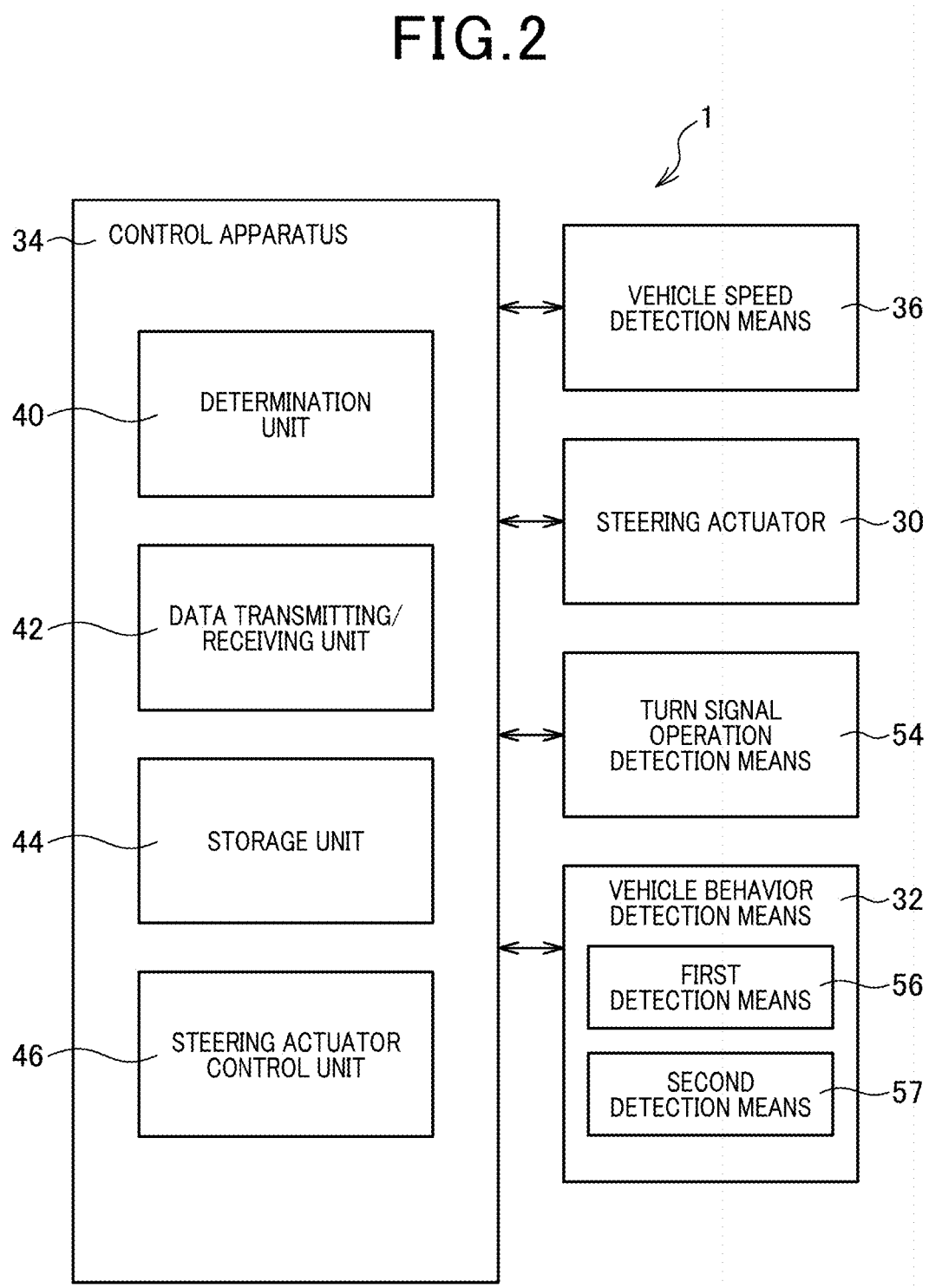
FIG. 2 is a block diagram showing a configuration of a control system.

FIG. 2 is a block diagram showing a configuration of a control system 1 in the saddle-ride vehicle 10 according to the present embodiment.

The control apparatus 34 is connected, via a data transmitting/receiving unit 42, to a vehicle speed sensor 36 that detects the speed of the vehicle 10, a steering actuator 30, a vehicle behavior detection means 32 that detects the behavior of the vehicle 10, and turn signal operation detection means 54 that detects the turn signal operation performed by the rider U.

Note that the turn signal operation includes a turn signal turn-on operation and a turn signal turn-off operation.

The control apparatus 34 includes a data transmitting/receiving unit 42 including an interface circuit that exchanges data with the CPU and other apparatuses, and a storage unit 44 that stores data. The storage apparatus included in the storage unit 44 may be, for example, an SSD (solid state device).

The control apparatus 34 includes a first control mode that performs control to apply a predetermined steering torque to a suspension apparatus 31 in response to the roll angular velocity detected by the first detection means 56, and a second control mode that performs control to apply a second steering torque smaller than the first steering torque. The parameters and control programs for each control are stored in the storage unit 44. The control apparatus 34 also includes a determination unit 40 that determines whether or not a predetermined condition is satisfied for switching between the first control mode and the second control mode.

The CPU executes a program stored in the storage unit 44 to realize the function of the determination unit 40. The determination unit 40 determines that a predetermined condition is satisfied when the vehicle behavior detection means 32 detects a physical quantity that satisfies the predetermined condition. Details of the determination processing will be described later.

Furthermore, the CPU executes the program stored in the storage unit 44, to realize the function of an actuator control unit 46 that controls the steering actuator 30 that applies torque in the steering direction to the suspension apparatus 31 that supports the handle 21.

Figure 3:
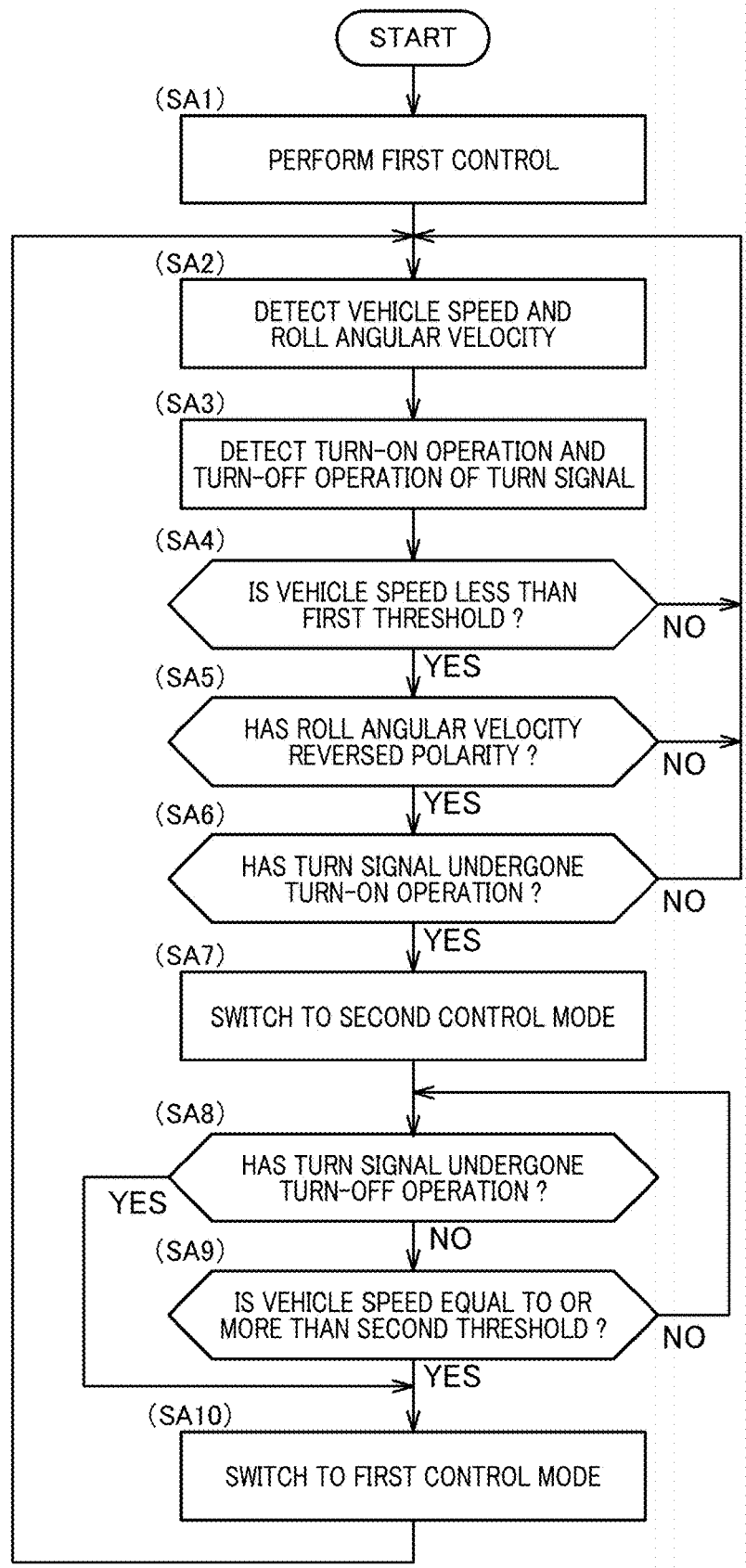
FIG. 3 is a flowchart of control processing in the saddle-ride vehicle.

FIG. 3 is a flowchart of control processing in the saddle-ride vehicle 10 according to the present embodiment. In the first control mode, the control apparatus 34 performs control to apply a predetermined first steering torque to the suspension apparatus 31 in response to the roll angular velocity detected by the first detection means 56 while the vehicle is running. Furthermore, in the second control mode, the control apparatus 34 performs control to apply a predetermined second steering torque that is smaller than the first steering torque (see FIG. 6, which will be described later).

During normal running, the control apparatus 34 performs control according to the first control mode (step SA1). Specifically, the control apparatus 34 performs attitude stabilization control and performs a steering assist to maintain the vehicle upright with respect to the road surface.

The control apparatus 34 calculates the vehicle speed from the information detected with the vehicle speed sensor 36, and acquires the roll angular velocity with the first detection means 56 (step SA2). Of course, the control apparatus 34 may calculate the roll angle detected by the second detection means 57 to calculate the roll angular velocity. The control apparatus 34 detects a turn-on operation and a turn-off operation of the turn signal performed by the rider U (step SA3). The determination unit 40 determines whether or not the vehicle speed is less than a predetermined first threshold (step SA4). The first threshold is stored in the storage unit 44 in advance. Note that, as the first threshold, a value corresponding to the roll angular velocity may be stored in the storage unit 44 in the form of a lookup table.

If the vehicle speed is less than the first threshold (step SA4: YES), the determination unit 40 determines whether or not the roll angular velocity has reversed the polarity (step SA5). Specifically, for example, it is determined whether or not the vehicle has been steered from a counterclockwise turn to a clockwise turn. If the determination unit 40 determines that the roll angular velocity has reversed the polarity (step SA5: YES), the determination unit 40 further determines whether or not a turn-on operation of the turn signal has been performed (step SA6). If the determination unit 40 determines that the turn-on operation of the turn signal has been performed (step SA6: YES), the control apparatus 34 switches the vehicle control mode to the second control mode (step SA7).

In other words, the control apparatus 34 switches control from the first control mode to the second control mode based on the vehicle speed and the roll angle of the vehicle. Specifically, if it is detected that a turn-on operation of the turn signal is performed and a predetermined condition is satisfied, the control apparatus 34 switches the vehicle control from the first control mode to the second control mode. Here, the predetermined condition is a condition in which turning operations in mutually different directions have been successively performed and a turn signal turn-on operation has been performed. Successively performing turning operations in mutually different directions is not necessarily a case in which the first turning operation and the second turning operation are performed consecutively when two turning operations are performed. It may be a case in which another operation in a short period of time is included between the first turning operation and the second turning operation. Another operation means a handle operation that is performed in a shorter period of time than the first turning operation or the second turning operation, and includes, for example, a return operation performed by the rider U from a state in which the steering is turned excessively in turn-back of the handle.

Note that, in the present description, a turning operation means a handle operation that changes the direction in which the vehicle is traveling, such as a left turn operation or a right turn operation.

The first threshold is, for example, 10 km per hour.

If the determination unit 40 determines that the vehicle speed is equal to or higher than the first threshold (step SA4: NO), the process returns to step SA2. Furthermore, if the determination unit 40 determines that the roll angular velocity has not reversed the polarity (step SA5: NO), the process returns to step SA2. If the determination unit 40 determines that a turn-on operation of the turn signal has not been performed (step SA6: NO), the process returns to step SA2.

After the control apparatus 34 switches the control of the vehicle to the second control mode (step SA7), the determination unit 40 determines whether or not a turn-off operation of the turn signal has been performed (step SA8). Specifically, the control apparatus 34 detects the turn signal operation from the turn signal operation detection means 54, and the determination unit 40 makes the determination. If a turn-off operation of the turn signal has not been performed (step SA8: NO), the determination unit 40 determines whether or not the vehicle speed is equal to or higher than the second threshold (step SA9). Specifically, the control apparatus 34 calculates the vehicle speed from information detected with the vehicle speed sensor 36, and determines whether or not the vehicle speed is equal to or higher than the second threshold. If the determination unit 40 determines that the vehicle speed is equal to or higher than the second threshold (step SA9: YES), the control apparatus 34 switches the control to the first control mode (SA10) and returns to step SA2.

The second threshold is, for example, 20 km per hour. The second threshold is stored in the storage unit 44 in advance.

If the determination unit 40 determines that a turn-off operation of the turn signal has been performed (step SA8: YES), the control apparatus 34 switches the vehicle control to the first control mode (SA10) and the process returns to step SA2. Of course, the determination unit 40 may detect the control result of automatically turning off the turn signal at the same time as the end of steering, to make the above determination.

If the determination unit 40 determines that the vehicle speed is less than the second threshold (step SA9: NO), the process returns to step SA8.

To summarize the above, if detecting a turn-off operation of the turn signal, the control apparatus 34 switches the vehicle control from the second control mode to the first control mode. Furthermore, if a turn-off operation of the turn signal has been performed and the vehicle speed is equal to or higher than the predetermined second threshold, the control apparatus 34 switches from the second control mode to the first control mode.

Figure 4:
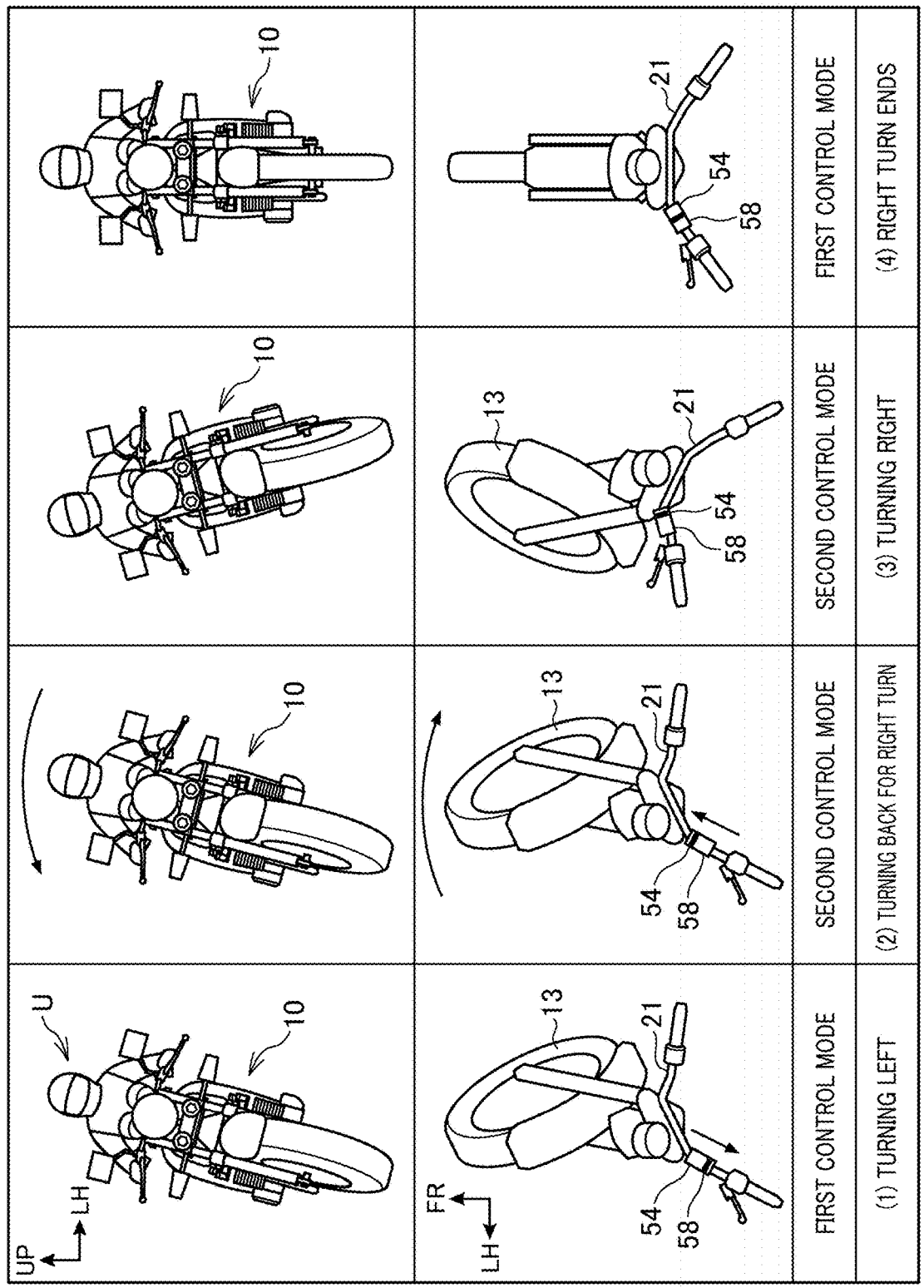
FIG. 4 is a conceptual diagram illustrating an example of a relationship between turn signal operations and control modes.

FIG. 4 is a conceptual diagram illustrating an example of the relationship between a turn signal turn-on operation, a turn signal turn-off operation, and control modes. The top line is front views of the saddle-ride vehicle 10, and simply shows handle operations by the rider U and the accompanying behavior of the vehicle 10. The second line is a top view of the front part of the saddle-ride vehicle 10. There are shown handle operations, and turn-on and turn-off operations of the turn signal, performed by the rider U.

Assume that, when the vehicle 10 is running while being controlled in the first control mode and is turning left, the rider U performs a turn-on operation to operate the turn signal in a direction of the arrow ((1) a case in turning left). At this time, the rider U steers the handle 21 to the left, shifts his or her weight so that the vehicle rolls in the left direction, and operates the turn signal so that the left turn signal is turned on. Then, for a right turn, the rider U operates the turn signal so that the right turn signal is turned on, and the rider U starts a steering operation, that is, a turn-back for the right turn ((2) a case in turning back for a right turn). At this time, the control apparatus 34 switches the control mode from the first control mode to the second control mode if a predetermined condition is satisfied. While the vehicle 10 is turning clockwise for turning right ((3) a case in turning right), the control apparatus 34 continues control in the second control mode. Then, if the right turn ends, the rider U performs a turn-off operation of the turn signal and the vehicle reaches a predetermined speed or higher, the control apparatus 34 performs control in the first control mode ((4) case at the end of the right turn).

Figure 5:
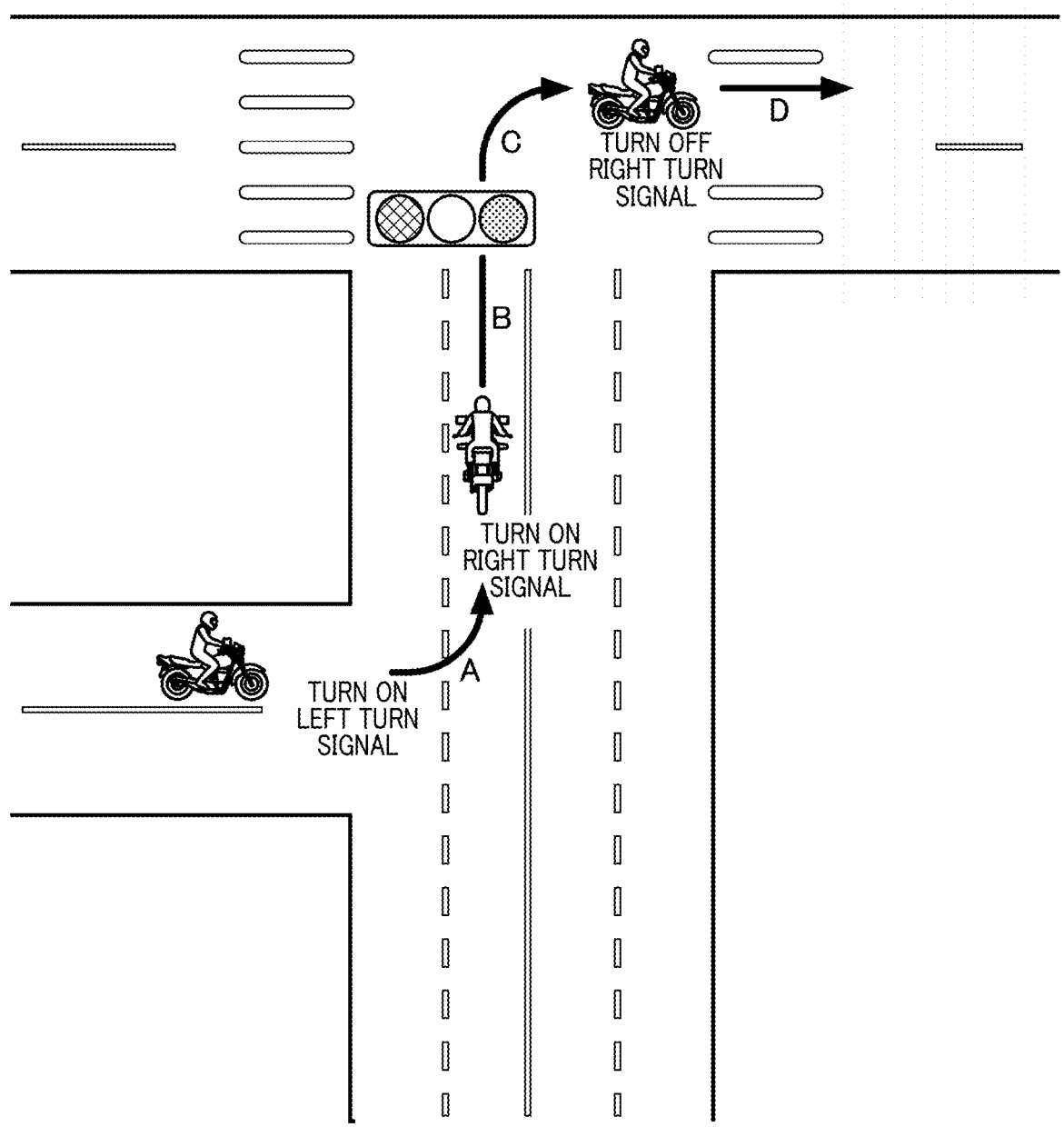
FIG. 5 is an explanatory diagram contrasting control shown in FIG. 4 with movement of the vehicle.

FIG. 5 is an explanatory diagram contrasting the control by the control apparatus 34 shown in FIG. 4 with the movement of the vehicle 10. First, the rider U turns the vehicle 10 to the left. At this time, the rider U performs a turn-on operation of the left turn signal, and the control apparatus 34 controls the vehicle 10 in the first control mode (area A). Thereafter, if it becomes necessary to make a right turn within a short period of time, the rider U performs a turn-on operation of the right turn signal. At this time, if a predetermined condition is satisfied, the control apparatus 34 switches the control mode from the first control mode to the second control mode and controls the vehicle 10 in the second control mode (area B). If control is performed in the first control mode in this area, the vehicle 10 may be too upright than what the rider U thinks the attitude of the vehicle 10 should be, to cause the rider U to feel discomfort.

The rider U turns the vehicle 10 to the right, and then turns off the right turn signal (area C). Thereafter, if a predetermined condition is satisfied, the control apparatus 34 switches the control mode from the second control mode to the first control mode, and controls the vehicle 10 in the first control mode (area D).

Figure 6:
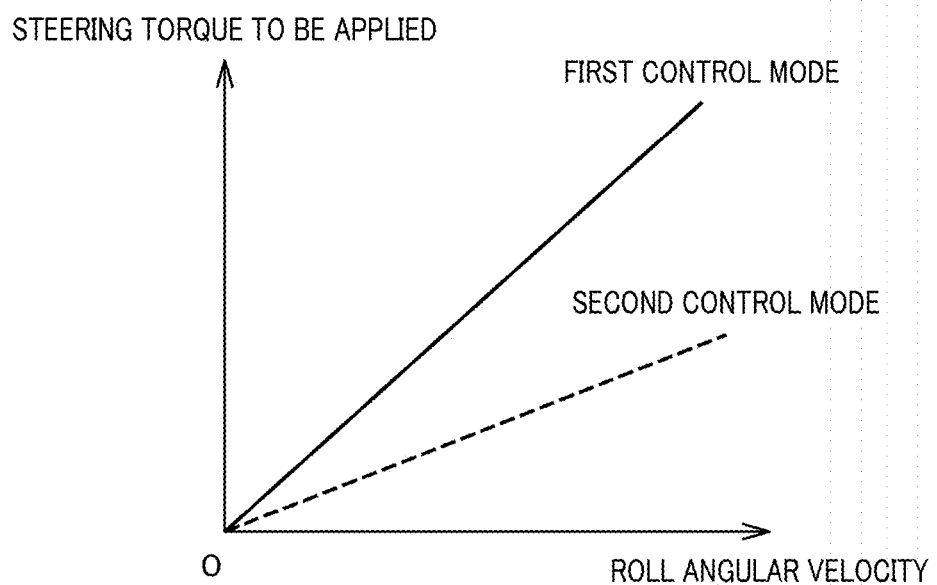
FIG. 6 is a graph illustrating a relationship between steering torque and roll angular velocity.

FIG. 6 is a graph illustrating a relationship between steering torque and roll angular velocity. The vertical axis represents the magnitude of the steering torque applied to the suspension apparatus 31 by the steering actuator 30, and the horizontal axis represents the roll angular velocity detected by the first detection means 56. During normal running, the control apparatus 34 controls the vehicle 10 according to the first control mode. In other words, when the roll angular velocity increases, steering torque is applied to return the vehicle in a direction that cancels out the change in the roll angular velocity. As the roll angular velocity increases, the steering torque that the steering actuator 30 applies to the suspension apparatus 31 also increases, controlling the vehicle in a direction to raise the vehicle body. In contrast, if the predetermined conditions are satisfied, the control apparatus 34 controls the vehicle 10 in the second control mode, and the magnitude of the steering torque applied at this time is smaller than that in the first control mode. If it is assumed that the rider U loosens the force for holding the steering angle in the turn signal operation, the steering control is weakened to prevent the vehicle body from rising too much to be steered. Control that weakens steering control includes control that does not apply steering torque, depending on the case.

Note that for each control mode, the relationship of how the steering torque to be applied depends on the roll angular velocity can be set in various ways depending on the type of vehicle and desired performance. Furthermore, the control apparatus 34 may perform control to change how the steering torque to be applied depends on the roll angular velocity based on the vehicle speed or roll angle, for example.

Second Embodiment

Figure 7:
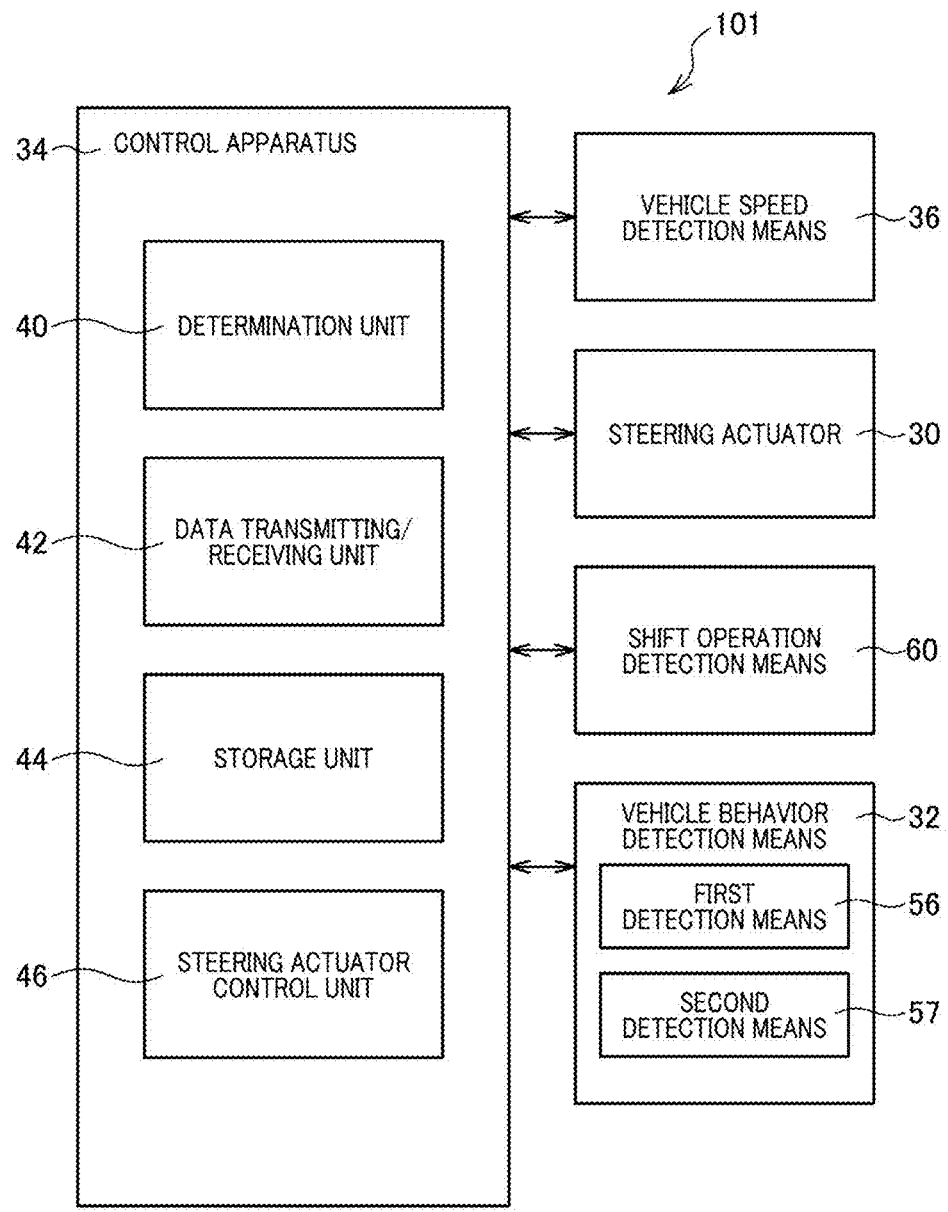
FIG. 7 is a block diagram showing a configuration of a control system in a saddle-ride vehicle according to a second embodiment.

FIG. 7 is a block diagram showing a configuration of the control system 101 in the saddle-ride vehicle 10 according to a second embodiment. The configuration of the saddle-ride vehicle 10 according to the second embodiment is similar to the configuration of the above-described embodiment (hereinafter referred to as the first embodiment), so a detailed description thereof will be omitted.

The control system 101 includes shift operation detection means 60 that detects a shift operation performed by the rider U. Specifically, the shift operation includes a clutch disengagement operation and a clutch engagement operation performed by the rider U. The shift operation detection means 60 is connected to control apparatus 34 via the data transmitting/receiving unit 42. A detected shift operation is used for determination by the determination unit 40 (see FIG. 8, which will be described later). The control apparatus 34 includes a shift operation timing recording unit (not shown) that records the timing of each shift operation.

Note that the other configurations of the control system 101 are the same as the control system 1 according to the first embodiment, so description thereof will be omitted.

Figure 8:
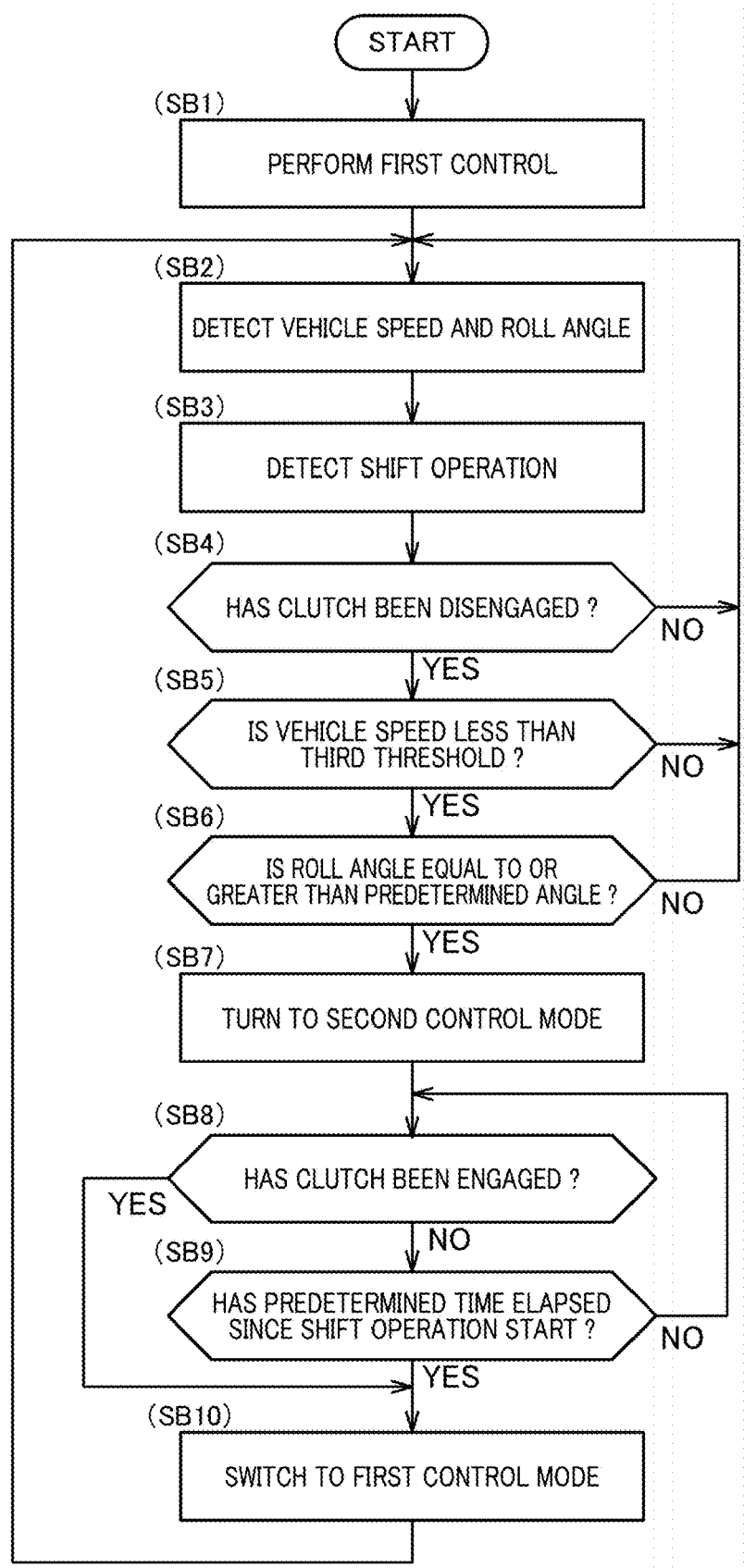
FIG. 8 is a flowchart of control processing in the saddle-ride vehicle according to the second embodiment.

FIG. 8 is a flowchart of control processing in the saddle-ride vehicle 10 according to the second embodiment. The control apparatus 34, which is provided in the saddle-ride vehicle 10 according to the present embodiment, performs control during running, the control modes of which include a predetermined first control mode and a predetermined second control mode. In the first control mode, the control apparatus 34 performs first control to apply a predetermined steering torque to the suspension apparatus 31 in response to the roll angular velocity detected by the first detection means 56 while the vehicle is running. In the second control mode, the control apparatus 34 performs second control to apply a second steering torque smaller than the first steering torque (see FIG. 6 described above).

During normal running, the control apparatus 34 controls the vehicle in the first control mode (step SB1). At this time, the control apparatus 34 performs attitude stabilization control and performs a steering assist to maintain the vehicle upright with respect to the road surface.

The control apparatus 34 calculates the vehicle speed from the information detected with the vehicle speed sensor 36, and acquires the roll angle with the second detection means 57 (step SB2). Of course, the control apparatus 34 may calculate the roll angular velocity etc. detected by the first detection means 56 to calculate the roll angle. The control apparatus 34 detects a shift operation performed by the rider U (step SB3). The determination unit 40 determines whether or not the rider U has performed an operation to disengage the clutch with a clutch lever 62, which is shift operation means to be described later (SB4). If the determination unit 40 determines that the clutch has been disengaged (step SB4: YES), the determination unit 40 then determines whether or not the vehicle speed is less than a predetermined third threshold (step SA4). The third threshold is stored in the storage unit 44 in advance. Note that, as the third threshold, a value corresponding to the roll angle may be stored in the storage unit 44 in a form of a lookup table.

If the determination unit 40 determines that the vehicle speed is less than the third threshold (step SB5: YES), the determination unit 40 determines whether or not the roll angle detected by the first detection means 56 is equal to or greater than a predetermined angle (step SB6). If the determination unit 40 determines that the roll angle is equal to or greater than the predetermined angle (step SB6: YES), the control apparatus 34 switches from the first control mode to the second control mode and controls the vehicle according to the second control mode (step SB7).

If the determination unit 40 determines that the clutch is not disengaged (step SB4: NO), the process returns to step SB2. If the determination unit 40 determines that the vehicle speed is equal to or higher than the third threshold (step SB5: NO), the process returns to step SB2. If the determination unit 40 determines that the roll angle is less than the predetermined angle (step SB6: NO), the process returns to step SB2.

In other words, the saddle-ride vehicle 10 according to the present embodiment includes the shift operation detection means 60 that detects that a shift operation has been performed; and if the shift operation detection means (60) detects that a shift operation has been performed, the control apparatus 34 switches from the first control mode to the second control mode when vehicle 10 satisfies predetermined conditions. Specifically, the control apparatus 34 switches from the first control mode to the second control mode based on the vehicle speed and roll angle. Here, the predetermined condition is, for example, a condition in which turning operations in mutually different directions are performed successively, the vehicle speed becomes slower than a predetermined speed, the roll angle exceeds a predetermined angle, and the rider U operates the clutch lever 62 to disengage the clutch.

Note that the third threshold is, for example, 30 km per hour. Furthermore, the predetermined angle for the roll angle is, for example, 15 degrees.

Next, the determination unit 40 determines whether or not the clutch is engaged (step SB8). If the determination unit 40 determines that the clutch is not engaged (step SB8: NO), the determination unit 40 determines whether or not a predetermined time has elapsed since the most recent shift operation (step SB9). At this time, the shift operation timing, the time at which the shift operation was performed, or the like may be used that is recorded by the shift operation timing recording unit. If the determination unit 40 determines that a predetermined time has elapsed since the most recent shift operation (step SB9: YES), the control apparatus 34 switches the control mode from the second control mode to the first control mode, performs the first control of the vehicle (step SB10), and then returns to step SB2.

If the determination unit 40 determines that the clutch is engaged (step SB8: YES), the control apparatus 34 switches the control mode from the second control mode to the first control mode, performs the first control of the vehicle (step SB10), and then returns to step SB2. In addition, if the determination unit 40 determines that a predetermined time has not elapsed since the most recent shift operation (step SB9: NO), the process returns to step SB8.

In summary, in the saddle-ride vehicle 10 according to the present embodiment, if the shift operation detection means 60 detects that the shift operation has ended, the control apparatus 34 switches from the second control mode to the first control mode. Furthermore, if a predetermined time has elapsed since the shift operation, the control apparatus 34 switches from the second control mode to the first control mode.

Note that here, the above-mentioned predetermined time is, for example, 2 seconds. The predetermined time is stored in the storage unit 44 in advance.

Figure 9:
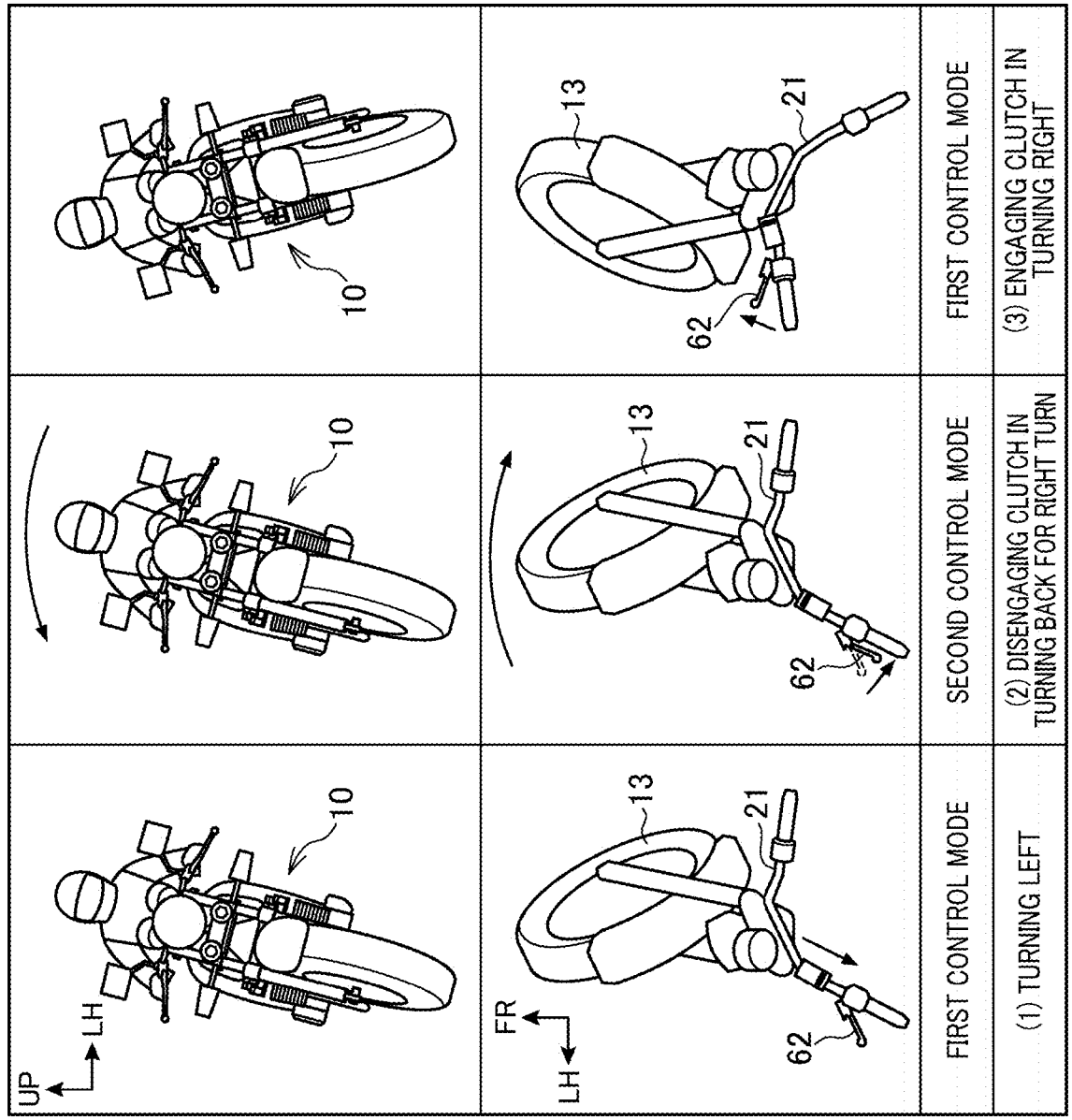
FIG. 9 is a conceptual diagram illustrating a relationship between shift operations and control modes.

FIG. 9 is a conceptual diagram illustrating the relationship between shift operations and control modes. The top line is front views of the saddle-ride vehicle 10, and simply shows handle operations by the rider U and the accompanying behavior of the vehicle 10. The second line is a top view of the front part of the saddle-ride vehicle 10. There are shown handle operations, and turn-on and turn-off operations of the turn signal, performed by the rider U.

Assume that the vehicle 10 turns left when being running under control in the first control mode ((1) a case in turning left). At this time, the handle 21 is steered to the left and the rider U shifts his or her weight, causing the vehicle to roll in the left direction. Next, the rider U closes the clutch lever 62 for a shift operation, and the rider U starts a steering operation, that is, a turn-back for a right turn ((2) a case of disengaging clutch in turning back for a right turn). At this time, if a predetermined condition is satisfied, the control apparatus 34 switches the vehicle control from the first control mode to the second control mode. If a predetermined condition is satisfied, for example, when the clutch lever 62 is opened and the clutch is engaged while the vehicle 10 is turning clockwise for turning right ((3) case of engaging clutch in turning right), the control apparatus 34 switches from the second control mode to the first control mode and controls the vehicle 10 in the first control mode.

Configuration Supported by the Above Embodiments

The above embodiments support the following configurations.

Configuration 1

A saddle-ride vehicle including: a steering actuator that applies torque in a steering direction to a suspension apparatus supporting a steering wheel; first detection means that detects a roll angular velocity of a vehicle; and a control apparatus that controls the steering actuator, based on the roll angular velocity detected by the first detection means, to apply the torque to the suspension apparatus, in which the control apparatus: includes modes of the control, the modes including a first control mode that performs control to apply a predetermined first steering torque, and a second control mode that performs control to apply a second steering torque smaller than the first steering torque; and switches between the first control mode and the second control mode if a predetermined condition is satisfied.

If turning operations in mutually different directions are performed successively, a steering assist to maintain the upright state may cause the rider to feel discomfort. According to such a configuration, if a predetermined condition is satisfied, a steering assist can be performed with a smaller torque than the steering torque for attitude stabilization control in normal running. This makes it possible to prevent the rider from feeling discomfort when turning operations in mutually different directions are performed successively.

Configuration 2

The saddle-ride vehicle according to Configuration 1, further including: second detection means that detects a roll angle of the vehicle; and vehicle speed detection means that detects a speed of the vehicle, in which the predetermined condition includes at least one of the roll angle, the roll angular velocity, and the vehicle speed.

If the vehicle speed is slow, it may be difficult for the riders to stabilize the attitude. Furthermore, if the roll angle is large or the roll angular velocity is large, it may be difficult for the rider to stabilize the attitude. According to such a configuration, the control of the steering torque to be applied can be changed depending on the vehicle speed, the roll angle, or the roll angular velocity, making it possible to realize a saddle-ride vehicle that can easily maintain a stable attitude without causing the rider to feel discomfort while driving.

Configuration 3

The saddle-ride vehicle according to Configuration 2, further including turn signal operation detection means that detects a turn-on operation and a turn-off operation of a turn signal, in which, if the predetermined condition is satisfied, and if the turn signal operation detection means detects that a turn-on operation of a turn signal has been performed, the control apparatus switches from the first control mode to the second control mode.

When a turn-on operation of the turn signal is performed, the force with which the rider grasps the handle decreases, making it difficult to maintain the steering angle of the handle. Therefore, the rider may feel discomfort while driving when a turning operation is performed, a turn-on operation of the turn signal is performed, and a steering assist for attitude stabilization control is performed in the same manner as that in normal running. According to such a configuration, during the turn signal turn-on operation, the control apparatus can switch from the first control mode, which is normal attitude stabilization control with a large steering torque, to the second control mode, which includes a steering assist with a small steering torque. This makes it possible to realize a saddle-ride vehicle that can easily maintain a stable attitude without causing the rider to feel discomfort while driving.

Configuration 4

The saddle-ride vehicle according to Configuration 3, in which, if the turn signal operation detection means detects that a turn-off operation of the turn signal has been performed, the control apparatus switches from the second control mode to the first control mode.

After the turn-off operation of the turn signal is performed, the force with which the rider grasps the handle recovers. In that case, it is preferable that the same steering assist for attitude stabilization control as that in normal running be performed. According to such a configuration, the control apparatus can switch from the second control mode with a small steering torque to the first control mode including a steering assist with a large steering torque. This makes it possible to realize a saddle-ride vehicle that can easily maintain a stable attitude without causing the rider to feel discomfort while driving.

Configuration 5

The saddle-ride vehicle according to any of Configurations 2 to 4, in which, if the vehicle speed becomes equal to or higher than a predetermined speed, the control apparatus switches from the second control mode to the first control mode.

Once the speed of the vehicle reaches a certain level, the attitude of the vehicle becomes more stable. According to such a configuration, the control apparatus can switch from the second control mode with a small steering torque to the first control mode including a steering assist with a large steering torque, in response to the vehicle speed. This makes it possible to realize a saddle-ride vehicle that can easily maintain a stable attitude without causing the rider to feel discomfort while driving.

Configuration 6

The saddle-ride vehicle according to Configuration 2, further including shift operation detection means that detects a shift operation, in which, if the predetermined condition is satisfied, and if the shift operation detection means detects that the shift operation has started, the control apparatus switches from the first control mode to the second control mode.

When a shift operation is performed, specifically when the clutch lever is opened and closed, the force with which the rider grasps the handle decreases, making it difficult to maintain the steering angle of the handle. Therefore, if the same steering assist for attitude stabilization control as that in normal running is performed during a turn, the rider may feel discomfort while driving. According to such a configuration, during a shift operation, the control apparatus can switch from the first control mode, which is normal attitude stabilization control with a large steering torque, to the second control mode, which includes a steering assist with a small steering torque. This makes it possible to realize a saddle-ride vehicle that can easily maintain a stable attitude without causing the rider to feel discomfort while driving.

Configuration 7

The saddle-ride vehicle according to Configuration 6, in which, if the shift operation detection means (60) detects that the shift operation has started, the control apparatus switches from the second control mode to the first control mode when a predetermined time has elapsed.

It is thought that the effects of shift shock disappear after a certain period of time has elapsed since the start of the shift operation. According to such a configuration, when a predetermined time has elapsed after the start of the shift operation, the control apparatus can switch from the second control mode with a small steering torque to the first control mode including a steering assist with a large steering torque. This makes it possible to realize a saddle-ride vehicle that can easily maintain a stable attitude without causing the rider to feel discomfort while driving.

Configuration 8

The saddle-ride vehicle according to Configuration 6 or 7, in which, if the shift operation detection means detects that the shift operation has ended, the control apparatus switches from the second control mode to the first control mode.

When the shift operation ends, that is, when the clutch is engaged, the opening/closing operation of the clutch lever ends and the force with which the rider grasps the handle recovers. Therefore, even if a steering assist is performed for attitude stabilization control, the rider is likely to be able to follow without a problem. In that case, it is preferable that the same steering assist for attitude stabilization control as that in normal running be performed. According to such a configuration, the control apparatus can switch from the second control mode with a small steering torque to the first control mode including a steering assist with a large steering torque. This makes it possible to realize a saddle-ride vehicle that can easily maintain a stable attitude without causing the rider to feel discomfort while driving.

The embodiment described above illustrates an aspect of the present invention, and can be modified and applied in any way without departing from the spirit of the present invention. Of course, there may be an aspect in which the first embodiment and the second embodiment are combined.

In addition, the processing units in the flowcharts shown in FIGS. 3 and 8 are divided according to the main processing substance in order to facilitate understanding of the processing of the control apparatus 34, and the present disclosure is not limited by the way of division or the name of the processing unit.

The processing of the control apparatus 34 can be divided into more processing units depending on the processing substance, or can be divided so that one processing unit includes even more processing. Furthermore, the processing order in the above flowchart is not limited to the illustrated example.

REFERENCE SIGNS LIST 10 saddle-ride vehicle (vehicle)
13 front wheel (steering wheel)
30 steering actuator
31 suspension apparatus
34 control apparatus 36 vehicle speed sensor (vehicle speed detection means)
40 determination unit
46 steering actuator control unit
54 turn signal operation detection means
56 first detection means
57 second detection means
60 shift operation detection means

The invention claimed is:
1. A saddle-ride vehicle comprising:
a steering actuator that applies torque in a steering direction to a suspension apparatus supporting a steering wheel;
an IMU (Inertial Measurement Unit) that detects a roll angular velocity of a vehicle; and
a control apparatus that controls the steering actuator, based on the roll angular velocity detected by the IMU, to apply the torque to the suspension apparatus, wherein the control apparatus comprises a CPU (Central Processing Unit), a RAM (Random Access Memory) used as a work area and storage area for the CPU, and a ROM (Read-Only Memory) for storing an operating system and programs executed by the CPU,
wherein the CPU is configured to execute the programs such that the control apparatus:
includes modes of the control, the modes including a first control mode that performs control to apply a predetermined first steering torque, and a second control mode that performs control to apply a second steering torque smaller than the first steering torque; and
switches from the first control mode to the second control mode in a turn-back between successive left and right turns with a polarity reversal of the roll angular velocity if a predetermined condition is satisfied in which control in the first control mode may cause the vehicle to stand too upright and lead to a situation that causes a rider to feel discomfort.
2. A saddle-ride vehicle comprising:
a steering actuator that applies torque in a steering direction to a suspension apparatus supporting a steering wheel;
an IMU (Inertial Measurement Unit) that detects a roll angular velocity of a vehicle; and
a control apparatus that controls the steering actuator, based on the roll angular velocity detected by the IMU, to apply the torque to the suspension apparatus, wherein the control apparatus comprises a CPU (Central Processing Unit), a RAM (Random Access Memory) used as a work area and storage area for the CPU, and a ROM (Read-Only Memory) for storing an operating system and programs executed by the CPU,
wherein the CPU is configured to execute the programs such that the control apparatus:
includes modes of the control, the modes including a first control mode that performs control to apply a predetermined first steering torque, and a second control mode that performs control to apply a second steering torque smaller than the first steering torque; and
switches from the first control mode to the second control mode if speed of the vehicle is less than a predetermined threshold, the roll angular velocity has reversed polarity, and a turn signal of the vehicle has undergone a turn-on operation.
3. A saddle-ride vehicle comprising:
a steering actuator that applies torque in a steering direction to a suspension apparatus supporting a steering wheel;
an IMU (Inertial Measurement Unit) that detects a roll angular velocity of a;
vehicle and a roll angle of the vehicle;
a vehicle speed sensor that detects a speed of the vehicle;
a turn signal operation switch that detects a turn-on operation and a turn-off operation of a turn signal; and
a control apparatus that controls the steering actuator, based on the roll angular velocity detected by the IMU, to apply the torque to the suspension apparatus, wherein the control apparatus comprises a CPU (Central Processing Unit), a RAM (Random Access Memory) used as a work area and storage area for the CPU, and a ROM (Read-Only Memory) for storing an operating system and programs executed by the CPU,
wherein the CPU is configured to execute the programs such that the control apparatus:
includes modes of the control, the modes including a first control mode that performs control to apply a predetermined first steering torque, and a second control mode that performs control to apply a second steering torque smaller than the first steering torque; and
switches from the first control mode to the second control mode if a predetermined condition is satisfied and if the turn signal operation switch detects that a turn-on operation of a turn signal has been performed, and
the predetermined condition includes at least one of conditions for the roll angle, the roll angular velocity, and the vehicle speed.
4. The saddle-ride vehicle according to claim 3, wherein, if the turn signal operation switch detects that a turn-off operation of the turn signal has been performed, the control apparatus switches from the second control mode to the first control mode.
5. A saddle-ride vehicle comprising:
a steering actuator that applies torque in a steering direction to a suspension apparatus supporting a steering wheel;
an IMU (Inertial Measurement Unit) that detects a roll angular velocity of a
vehicle and a roll angle of the vehicle;
a vehicle speed sensor that detects a speed of the vehicle; and
a control apparatus that controls the steering actuator, based on the roll angular velocity detected by the IMU, to apply the torque to the suspension apparatus, wherein the control apparatus comprises a CPU (Central Processing Unit), a RAM (Random Access Memory) used as a work area and storage area for the CPU, and a ROM (Read-Only Memory) for storing an operating system and programs executed by the CPU,
wherein the CPU is configured to execute the programs such that the control apparatus:
includes modes of the control, the modes including a first control mode that performs control to apply a predetermined first steering torque, and a second control mode that performs control to apply a second steering torque smaller than the first steering torque; and
switches between the first control mode and the second control mode if a predetermined condition is satisfied, the predetermined condition includes at least one of the roll angle, the roll angular velocity, and the vehicle speed, and if the vehicle speed becomes equal to or higher than a predetermined speed, the control apparatus switches from the second control mode to the first control mode.

6. A saddle-ride vehicle comprising:

a steering actuator that applies torque in a steering direction to a suspension apparatus supporting a steering wheel;

an IMU (Inertial Measurement Unit) that detects a roll angular velocity of a vehicle and a roll angle of the vehicle;

a vehicle speed sensor that detects a speed of the vehicle; and a shift operation detection sensor that detects a shift operation; and a control apparatus that controls the steering actuator, based on the roll angular velocity detected by the IMU, to apply the torque to the suspension apparatus, wherein the control apparatus comprises a CPU (Central Processing Unit), a RAM (Random Access Memory) used as a work area and storage area for the CPU, and a ROM (Read-Only Memory) for storing an operating system and programs executed by the CPU, wherein the CPU is configured to execute the programs such that the control apparatus:

includes modes of the control, the modes including a first control mode that performs control to apply a predetermined first steering torque, and a second control mode that performs control to apply a second steering torque smaller than the first steering torque; and switches from the first control mode to the second control mode if a predetermined condition is satisfied and if the shift operation detection sensor detects that the shift operation has started, and the predetermined condition includes at least one of the roll angle, the roll angular velocity, and the vehicle speed.

7. The saddle-ride vehicle according to claim 6, wherein, if the shift operation detection sensor detects that the shift operation has started, the control apparatus switches from the second control mode to the first control mode when a predetermined time has elapsed.

8. The saddle-ride vehicle according to claim 6, wherein, if the shift operation detection sensor detects that the shift operation has ended, the control apparatus switches from the second control mode to the first control mode.

9. The saddle-ride vehicle according to claim 7, wherein, if the shift operation detection sensor detects that the shift operation has ended, the control apparatus switches from the second control mode to the first control mode.

* * * * *